(12) United States Patent
Konishi et al.

(10) Patent No.: US 7,943,890 B2
(45) Date of Patent: May 17, 2011

(54) DISCHARGE LAMP LIGHTING DEVICE AND IMAGE DISPLAY DEVICE WITH SWITCHING FREQUENCY

(75) Inventors: Hirofumi Konishi, Hirakata (JP); Jyunichi Uekariya, Tamba (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 485 days.

(21) Appl. No.: 12/096,088

(22) PCT Filed: Dec. 21, 2006

(86) PCT No.: PCT/JP2006/325546
§ 371 (c)(1),
(2), (4) Date: Jun. 4, 2008

(87) PCT Pub. No.: WO2007/072925
PCT Pub. Date: Jun. 28, 2007

(65) Prior Publication Data
US 2009/0323033 A1 Dec. 31, 2009

(30) Foreign Application Priority Data
Dec. 22, 2005 (JP) ................. P2005-368957

(51) Int. Cl.
*G01J 1/32* (2006.01)
*H03K 17/78* (2006.01)
*G03B 21/20* (2006.01)
(52) U.S. Cl. .................. 250/205; 250/214 SW; 353/85
(58) Field of Classification Search ............ 353/85, 353/122, 121; 250/205, 214 R, 214 SW; 315/224, 209 R, 225, 291, 294, 297, 302, 315/247, 246, 307, 311, 169.3, 169.4, 360; 345/102, 101, 204, 211–214, 82
See application file for complete search history.

(56) References Cited

U.S. PATENT DOCUMENTS 6,693,393 B2 * 2/2004 Konishi et al. ............. 315/224
(Continued)

FOREIGN PATENT DOCUMENTS

JP   5-176526   7/1993
(Continued)

OTHER PUBLICATIONS

English language Abstract of JP 2005-25995, Jan. 27, 2005.
(Continued)

*Primary Examiner* — Que T Le
*Assistant Examiner* — Pascal M Bui-Pho
(74) *Attorney, Agent, or Firm* — Greenblum & Bernstein, P.L.C.

(57) ABSTRACT

An output of a load voltage detector is read by an A/D converter, and a reference value Is and a switching frequency are decided by a microcomputer. In order that the decided switching frequency can be achieved, a SET signal is inputted from a switching frequency counting unit to a drive controller, and a switching element is turned on. When a current flowing through the switching element, which is detected by a resistor, exceeds the reference value Is of a reference arithmetic unit, a RESET signal is inputted from a current detector to the drive controller, and the switching element is turned off. Thereafter, the reference value Is and the switching frequency are set so that the switching element can be turned on at the next time at timing when a regenerative current of a diode turns to substantial zero. As described above, the switching frequency is controlled in response to a state of a discharge lamp while controlling the switching element to turn on at the timing when the regenerative current turns to substantial zero without bringing up a cost increase of a discharge lamp lighting device.

16 Claims, 7 Drawing Sheets

U.S. PATENT DOCUMENTS

| | | |
|---|---|---|
| 6,894,437 B2 | 5/2005 | Okamoto et al. |
| 2003/0076053 A1* | 4/2003 | Kambara et al. ............... 315/224 |
| 2003/0098659 A1 | 5/2003 | Okamoto et al. |
| 2004/0246750 A1* | 12/2004 | Ichikawa et al. ........... 363/21.12 |
| 2006/0049777 A1* | 3/2006 | Kumagai et al. ............... 315/224 |
| 2007/0138975 A1 | 6/2007 | Suganuma et al. |
| 2007/0210727 A1 | 9/2007 | Sun et al. |
| 2008/0030143 A1 | 2/2008 | Goriki et al. |
| 2008/0048586 A1 | 2/2008 | Hasegawa et al. |
| 2008/0143270 A1 | 6/2008 | Sun et al. |

FOREIGN PATENT DOCUMENTS

| | | |
|---|---|---|
| JP | 10-144488 | 5/1998 |
| JP | 2003-100485 | 4/2003 |
| JP | 2003-163093 | 6/2003 |
| JP | 2004-178925 | 6/2004 |
| JP | 2004-208357 | 7/2004 |
| JP | 2005-25995 | 1/2005 |
| JP | 2005-71921 | 3/2005 |
| JP | 2005-184964 | 7/2005 |
| JP | 2005-312105 | 11/2005 |

OTHER PUBLICATIONS

English language Abstract of JP 2005-184964, Jul. 7, 2005.
English language Abstract of JP 2004-208357, Jul. 22, 2004.
English language Abstract of JP 5-176526, Jul. 13, 1993.
English language Abstract of JP 2004-178925, Jun. 24, 2004.
English language Abstract of JP 2005-312105, Nov. 4, 2005.
English language Abstract of JP 2005-71921, Mar. 17, 2005.
Japan Office action in JP Application No. 2005-368957, mailed on Dec. 21, 2010.

* cited by examiner

ACOUSTIC RESONANCE FREQUENCY RANGE: f1~f2, f3~f4
FIXED FREQUENCY RANGE: V1~V2, V3~V4

ACOUSTIC RESONANCE FREQUENCY RANGE: f1~f2, f3~f4
FIXED FREQUENCY RANGE: V1~V2, V3~V4, V5 OR MORE

ACOUSTIC RESONANCE FREQUENCY RANGE: f1~f2, f3~f4
FIXED FREQUENCY RANGE: V0~V1, V2~V3, V4~V5

DISCHARGE LAMP LIGHTING DEVICE AND IMAGE DISPLAY DEVICE WITH SWITCHING FREQUENCY

TECHNICAL FIELD

The present invention relates to a discharge lamp lighting device that lights a discharge lamp, and to an image display device using the discharge lamp lighting device.

BACKGROUND ART

As an example of a discharge lamp lighting device, there is one with a configuration shown in FIG. 11. This discharge lamp lighting device 100 is composed of a power supply circuit unit 101 and a lighting control circuit unit 102. The power supply circuit unit 101 is, for example, a chopper circuit. The power supply circuit unit 101 is composed of a direct current power supply E, a load 109, a switching element Q, a resistor R for detecting a current flowing through the switching element Q, a power transformer T, a diode D, a capacitor C, and a load voltage detector 103 that detects a voltage of the load 109. The switching element Q of the power supply circuit unit 101 performs a switching operation by a drive signal outputted from a drive controller 108 of the lighting control circuit unit 102 in response to a state (power, voltage and the like) of the load 109.

The lighting control circuit unit 102 is composed of a zero cross detector 104 that is connected to a secondary side of the power transformer T and detects that a secondary current has turned to zero, a current detector 105 that compares, in terms of magnitude, the current flowing through the switching element Q and a reference value Is corresponding to power of the load 109 with each other, a reference arithmetic unit 106 that outputs the reference value Is in response to the power of the load 109, an A/D converter 107 that performs A/D conversion for the load voltage detected by the load voltage detector 103, and the drive controller 108 that controls on/off of the switching element Q. The drive controller 108 is composed, for example, by having an RS flip-flop and the like.

With regard to a current of the power transformer T, during an on-time Ton while the switching element Q is being turned on, as shown in FIG. 12A, energy is charged to the power transformer T, and the current of the power transformer T is increased. During an off-time Toff while the switching element Q is being turned off, as shown in FIG. 12B, a regenerative current that releases the energy stored in the power transformer T flows through the capacitor C and the diode D, and is gradually decreased. When the energy stored in the power transformer T is entirely released, the current of the power transformer T turns to zero.

When it is detected that the energy stored in the power transformer T has turned to zero by the zero cross detector 104 of the lighting control circuit unit 102, as shown in FIG. 12C, the zero cross detector 104 inputs a turn-on signal of the switching element Q to a set input terminal SET of the drive controller 108. The drive controller 108 turns on the switching element Q.

The load voltage Vla is detected by the load voltage detector 103, and the load voltage Vla concerned is monitored by the reference arithmetic unit 106 through the A/D converter 107, whereby the reference voltage arithmetic unit 106 outputs the reference value Is corresponding to the power of the load 109. The current detector 105 compares a value detected by the resistor R from the current flowing through the switching element Q and a value of the reference value Is with each other. When the detected value of the current flowing through the switching element Q becomes more than the reference value Is, as shown in FIG. 12D, the current detector 105 outputs a detection signal to a reset input terminal RESET of the drive controller 108, and the drive controller 108 turns off the switching element Q. FIG. 12E is a voltage output waveform of an output terminal Dout of the drive controller 108. In such a way, the discharge lamp lighting device can supply the appropriate power corresponding to the load voltage Vla, and moreover, can control the switching element Q to turn on at timing when the current flowing through the transistor T makes a zero cross.

In Patent Document 1 (Japanese Patent Laid-Open Publication No. 2004-178925), there is described a discharge lamp lighting device that turns off a chopper when the current flowing through the chopper becomes a predetermined reference value or more and turns on the chopper when energy release of a chopper coil is detected. This discharge lamp lighting device includes an off-time timer circuit that counts an off-time of the chopper, and includes a zero cross detector that, when a predetermined time is counted by the off-time timer circuit before detecting the energy release of the chopper coil, detects the energy release of the chopper coil while turns on the chopper at timing when the predetermined time is counted.

In the case of controlling the switching element Q to turn on at the timing of the zero cross of the current by the power supply circuit unit using the chopper circuit, which is shown in FIG. 11, the discharge lamp lighting device requires an operation to detect that the energy stored in the power transformer T has turned to zero. Accordingly, this discharge lamp lighting device requires zero cross detection using a secondary winding of the power transformer T, and has a problem that the number of parts is increased, bringing up a cost increase.

Moreover, an operation frequency in the case of controlling the switching element Q to turn on by the zero cross detection is decided by self-excitation by an input voltage Vin of the direct current power supply E, the load voltage Vla, load power, and an inductance value of the power transformer T. Accordingly, when the load voltage Vla of a discharge lamp is changed with time, a switching frequency is changed as shown by a broken line of FIG. 5. When noise of the switching frequency is superimposed on the load current, and a ripple component by the noise is superimposed on a frequency-prohibited range intrinsic to the load, there is also a problem that such a ripple cannot be avoided.

In particular, when the load 109 is a high-voltage discharge lamp, as the frequency-prohibited range intrinsic to the load, there is a range where an acoustic resonance phenomenon occurs, and there is an apprehension to bring up instability, fading, flickering and the like of arcs.

The present invention has been made in consideration for the points as described above. It is an object of the present invention to control the operation frequency of the switching element in response to a state of the discharge lamp without bringing up the cost increase of the discharge lamp lighting device, thus making it possible to control such on-timing of the switching element to be timing when the regenerative current turns to zero.

DISCLOSURE OF THE INVENTION

In order to achieve the above-described object, as shown in FIG. 1, a first invention is a discharge lamp lighting device including a switching circuit 2 that controls power supplied to a discharge lamp La, in which, in the switching circuit 2, a switching frequency is controlled in response to a state of the discharge lamp La, energy stored in an inductance component L when a switching element Q is turned on is released when the switching element Q is turned off, and the switching element Q is controlled to turn on at timing when a current for releasing the energy turns to substantial zero, the discharge lamp lighting device comprising: a load voltage detector 5 that detects a load voltage Vla; a switching frequency counting unit 8 that performs time measurement for setting the switching frequency based on the voltage detected from the load voltage detector 5 so that predetermined power of the discharge lamp can be achieved; a current detector 6 that detects that the current flowing through the switching circuit 2 has reached a predetermined reference value Is; a reference arithmetic unit 7 that sets the predetermined reference value Is based on the voltage detected from the load voltage detector 5 so that the switching element Q can be turned on on and after the timing when the current for releasing the energy turns to substantial zero at the switching frequency set by the switching frequency counting unit 8; and a drive controller 9 that controls the switching element Q to turn on upon receiving a signal of the switching frequency counting unit 8, and controls the switching element Q to turn off upon receiving an output signal of the current detector 6.

In accordance with the first invention, the switching frequency of the switching element is set in response to the load voltage, and the timing when the switching element is turned on is set by the switching frequency counting unit so as to achieve the switching frequency. Then, the reference value of the current, which decides the timing when the switching element is turned off, is set by the reference arithmetic unit so that the timing when the current for releasing the energy while the switching element is being turned off turns to substantially zero at the switching frequency thus set can just coincide with the next timing when the switching element is turned on. In such a way, the operation frequency of the switching element is controlled in response to the state of the discharge lamp without using the zero cross detection circuit, thus making it possible to control the timing when the switching element is turned on at the timing when the regenerative current turns to substantial zero. Hence, the zero cross detection circuit becomes unnecessary, whereby the number of parts is reduced, and a cost increase of the discharge lamp lighting device can be prevented or suppressed.

As shown in FIG. 2, a second invention is the discharge lamp lighting device in the first invention, further comprising: an input voltage detector 12 that detects an input voltage Vin of the switching circuit 2, wherein, based on the input voltage Vin detected from the input voltage detector 12 and the load voltage Vla detected from the load voltage detector 5, the switching frequency and the predetermined reference value Is are set so that the predetermined power of the discharge lamp can be achieved.

In accordance with the second invention, even if the input voltage of the switching circuit is different, the switching element can be operated to turn on at the timing when the regenerative current of the switching circuit turns to substantial zero.

A third invention is the discharge lamp lighting device in the first or second invention, wherein the switching frequency and the predetermined reference value are set so that the switching element Q can turn on at timing of a peak voltage of a free oscillation voltage generated when the current for releasing the energy becomes substantially zero.

In accordance with the third invention, the switching element turns on at timing when the voltage at the time when the switching element is off turns to substantial minimum. Accordingly, a switching loss can be reduced.

A fourth invention is the discharge lamp lighting device according to any one of the first to third inventions, wherein, as shown in FIG. 6 to FIG. 10, when the switching frequency set based on the voltage detected from the load voltage detector 5 is superimposed on an operation-prohibited range (an acoustic resonance frequency range and a frequency range where an occurrence of noise becomes a problem), the switching frequency counting unit 8 sets the switching frequency at a fixed frequency other than the operation-prohibited range.

In accordance with the fourth invention, the switching operation in the frequency range where an acoustic resonance of the high-voltage discharge lamp occurs and in the frequency range where the occurrence of the noise becomes a problem can be avoided.

A fifth invention is an image display device, comprising: the discharge lamp lighting device in any one of the first to fourth inventions; a discharge lamp turned on by the discharge lamp lighting device; image display means for transmitting therethrough or reflecting thereon light from the discharge lamp; and an optical system that projects transmission light or reflection light, which passes through the image display means, on a screen.

BEST MODE FOR CARRYING OUT THE INVENTION

Embodiment 1

Figure 1:
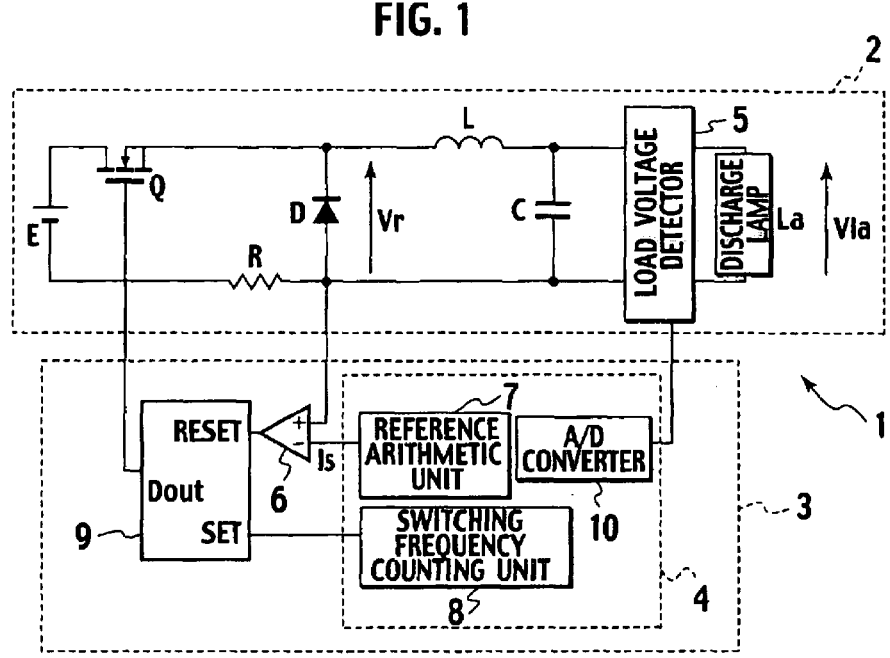
FIG. 1 is a circuit diagram showing a configuration of Embodiment 1 of the present invention.

FIG. 1 is a circuit diagram showing a configuration of a discharge lamp lighting device according to Embodiment 1 of the present invention. As shown in FIG. 1, the discharge lamp lighting device 1 is composed of a switching circuit 2 and a control circuit 3 thereof. The switching circuit 2 includes a direct current power supply E, a switching element Q, a choke coil L, a diode D, a capacitor C, and a resistor R. The switching circuit 2 is composed as a step-down chopper circuit. The switching element Q is composed, for example, of a MOSFET, turns on/off by a signal outputted from the control circuit 3, and performs switching so as to appropriately adjust power of a load.

The control circuit 3 controls the switching element Q to turn on/off so as to appropriately adjust the power of a discharge lamp La. The control circuit 3 is composed of a current detector 6, a reference arithmetic unit 7, a switching frequency counting unit 8, a drive controller 9, an A/D converter 10. The reference arithmetic unit 7, the switching frequency counting unit 8 and the A/D converter 10 are mounted in a microcomputer 4.

The current detector 6 compares, in terms of magnitude, a voltage value detected by the resistor R from a current flowing through the switching element Q and a reference value Is outputted from the reference arithmetic unit 7 in response to the power of the discharge lamp La with each other, and outputs an off signal of the switching element Q.

The A/D converter 10 converts a load voltage Vla (analog value) detected by a load voltage detector 5 into a digital signal with predetermined bits.

The reference arithmetic unit 7 is composed of the microcomputer 4 and the like. The reference arithmetic unit 7 outputs the reference value Is based on the load voltage subjected to the A/D conversion. This reference value Is is compared in terms of the magnitude with the current flowing through the switching element Q by the current detector 6.

The switching frequency counting unit 8 is composed of the microcomputer 4 and the like. The switching frequency counting unit 8 outputs an on signal of the switching element Q to the drive controller 9 based on the load voltage subjected to the A/D conversion. This on signal is outputted at timing when a regenerative current flowing through the diode D turns to zero.

Figure 13:
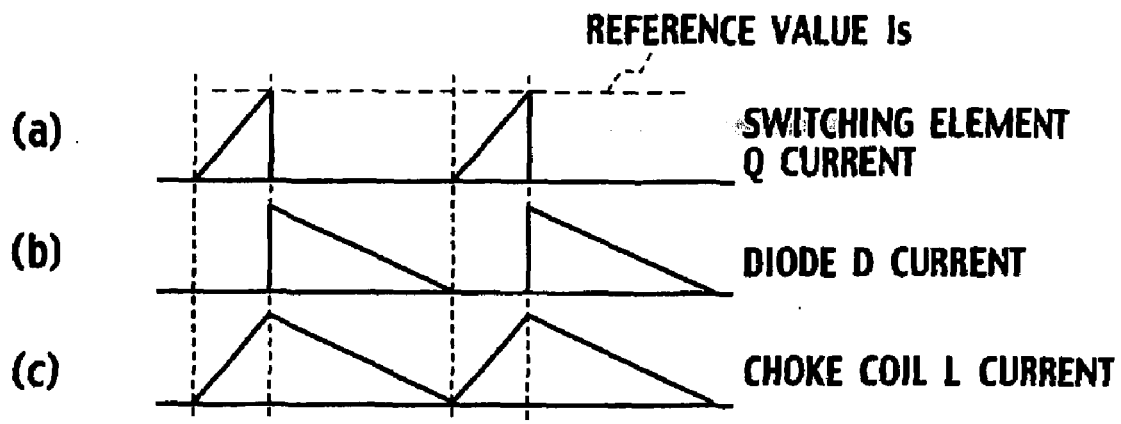
FIG. 13 is an operation explanatory view of the present invention.

The drive controller 9 is composed by using an RS flip-flop and the like. The drive controller 9 receives a turn-on signal, which is outputted from the switching frequency counting unit 8, to a set input terminal SET side, and receives a turn-off signal, which is outputted from the current detector 6, to a reset input terminal RESET side. In such a way, the drive controller 9 controls the switching element Q to turn on/off at the timing when the regenerative current turns to zero as shown in FIG. 13, thereby appropriately adjusting the power of the discharge lamp La.

The reference value Is of the reference arithmetic unit 7 and the switching frequency of the switching frequency counting unit 8 are obtained by using an input voltage Vin from the direct current power supply E, input power Pin therefrom, an inductance value L of the choke coil composing the chopper circuit and the load voltage Vla. From the following Expressions (1) to (4), a cycle (switching cycle Tc) in which the current turns to zero is obtained.

$$Ip = (Vin - Vla) \times Ton/L = Vla \times Toff/L \quad (1)$$

$$Tc = Ton + Toff \quad (2)$$

In the above expressions, Ton is an on time of the switching element Q, Toff is an off time of the switching element Q, Tc is the switching cycle (inverse number of the switching frequency) of the switching element Q. A unit of Ton, Toff and Tc is second. Ip is a peak current value (predetermined reference value Is=Ip×R) of the switching element Q. Moreover, from Expressions (1) and (2), the peak current Ip of the switching element Q can be obtained. A relationship in which the regenerative current of the chopper circuit makes a zero cross is represented by Expressions (1) and (2). Then, from Expressions (1) and (2), relationships as represented by the following Expressions (3) and (4) are derived:

$$\begin{aligned} Pin &= Vin \times Iin \\ &= Vin \times (Vin - Vla) \times Ton^2/(2 \times L \times Tc) \\ &= Tc \times (Vin - Vla) \times Vla^2/(2 \times L \times Vin) \end{aligned} \quad (3)$$

$$\therefore Tc = 2 \times L \times Pin \times Vin/(Vin - Vla) \times Vla^2 \quad (4)$$

Figure 12:
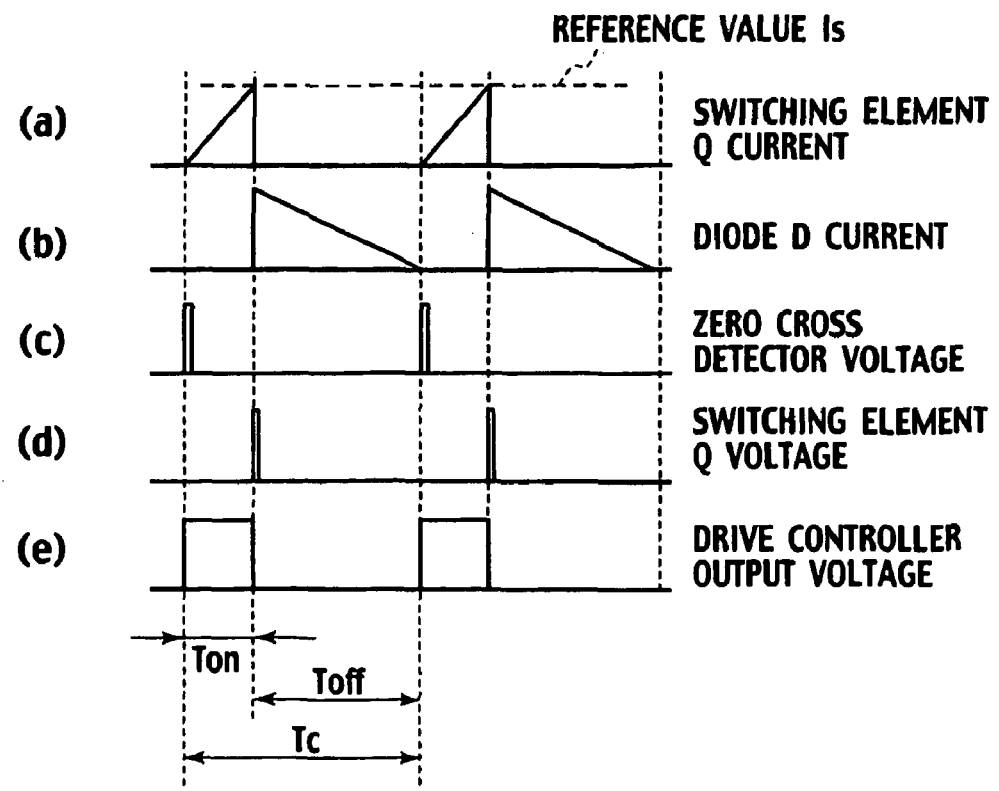
FIG. 12 is an operation explanatory view of a conventional example.

From Expression (4), the time of Tc shown in FIG. 12 is obtained. Hence, in order to turn on/off the switching element Q at the timing when the regenerative current turns to zero in response to the power of the load (discharge lamp La), it is necessary that the switching cycle Tc and the reference value Is be varied in response to the load voltage Vla.

In this embodiment, functions to output the switching cycle Tc and the reference value Is are integrated into the microcomputer 4, and while monitoring the load voltage Vla by the A/D converter 10, the switching cycle Tc and the reference value Is are controlled to be varied in response to the load voltage Vla so that predetermined power of the discharge lamp can be achieved. Note that the input voltage Vin is set at a fixed value. In such a way, in this embodiment, a necessity to use a zero cross detection circuit is eliminated, and the number of parts is reduced, whereby a cost increase of the discharge lamp lighting device 1 can be prevented or suppressed.

Suppose a case where a configuration is adopted, in which, every time when the load voltage Vla is read by the A/D converter 10, the switching cycle Tc and the reference value Is are arithmetically operated by using the above-described arithmetic expressions, and are outputted to the drive controller 9. Then, the microcomputer 4 with a high arithmetic operation speed becomes necessary, and cost of the parts is increased. Accordingly, table data of the reference value Is and the switching cycle Tc with respect to the load voltage Vla is stored in advance on a memory in the microcomputer 4.

With regard to timing of reading the load voltage Vla, in one in which the load voltage Vla of the discharge lamp La is changed relatively slowly, a control is performed, in which the load voltage Vla is read at an interval of, for example, 1 msec to 5 msec, and the reference value Is and the switching cycle Tc are not updated until the next load voltage Vla is read. As described above, the reference value Is and the switching cycle Tc are outputted from the table data prepared in advance, whereby the discharge lamp lighting device 1 can be composed of the microcomputer 4 that is relatively inexpensive.

As described above, in accordance with the discharge lamp lighting device 1, the data for controlling the switching element Q to turn on at the timing when the regenerative current flowing through the diode D of the chopper circuit turns to zero is prepared as the table data in advance on the memory of the microcomputer 4, and the control functions for the on/off timing of the switching element Q are integrated into the microcomputer 4. In such a way, zero cross detection as conventional, which uses the secondary winding of the power transformer T, becomes unnecessary, and the cost increase can be prevented or suppressed.

Embodiment 2

Figure 2:
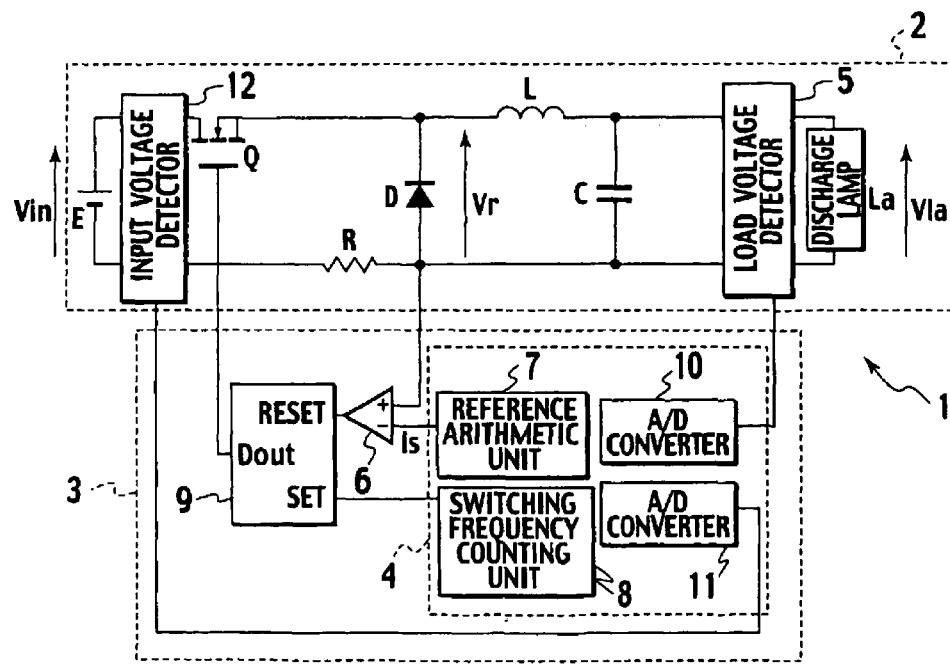
FIG. 2 is a circuit diagram showing a configuration of Embodiment 2.

FIG. 2 is a circuit diagram showing a configuration of a discharge lamp lighting device 1 according to Embodiment 2 of the present invention. A circuit of FIG. 2 is one in which, to the above-described circuit of FIG. 1, there are added an input voltage detector 12 that monitors the input voltage Vin from the direct current power supply E, and an A/D converter 11 that converts the input voltage Vin (analog value) detected by the input voltage detector 12 into a digital value with predetermined bits.

When the input voltage Vin from the direct current power supply E is changed, the reference value Is and the switching cycle Tc in the above-described arithmetic expressions are changed. Hence, in the microcomputer 4, plural pieces of the table data of the reference value Is and the switching frequency Tc with respect to the load voltage Vla are stored in advance in response to variations of the input voltage Vin from the direct current power supply E.

When the direct current power supply E is turned on, the input voltage detector 12 detects the input voltage Vin, and outputs the input voltage Vin to the A/D converter 11 of the microcomputer 4. The A/D converter 11 captures the input voltage Vin as the digital value. The microcomputer 4 selects the table data of the reference value Is and the switching cycle Tc, which corresponds to the input voltage Vin concerned, and obtains the reference value Is and the switching cycle Tc.

In such a way, the discharge lamp lighting device 1 can control the switching element Q to turn on at the timing when the regenerative current turns to zero in response to the change of the input voltage Vin from the direct current power supply E and the change of the load voltage Vla of the discharge lamp La.

The above description referring to FIG. 1 or FIG. 2 has been made of the case where the switching circuit 2 has a configuration of the step-down chopper circuit; however, depending on designing conditions of an input voltage variation range and the like, there is also a case where not the step-down chopper circuit but a step-up chopper circuit and a step-up/down chopper circuit are used. It is needless to say that the present invention can also be applied to such a case.

Embodiment 3

Next, a description will be made of a discharge lamp lighting device 1 according to Embodiment 3 of the present invention.

Figure 3:
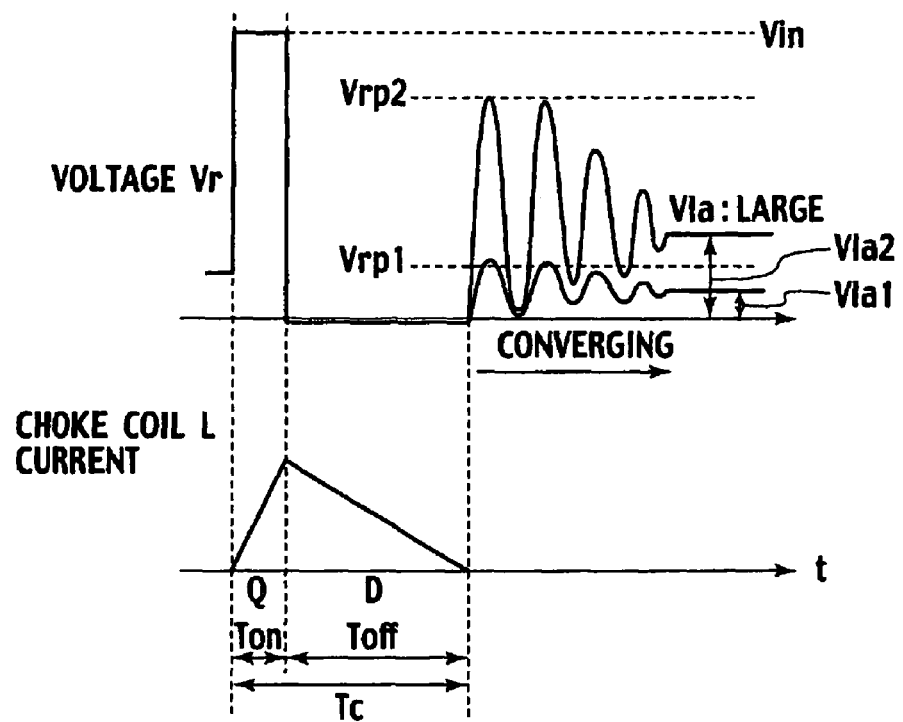
FIG. 3 is an operation explanatory view of Embodiment 3 of the present invention.

In the circuit configuration shown in FIG. 1 or FIG. 2, if the switching element Q does not turn on after the regenerative current flowing through the diode D turns to zero, then a voltage Vr of the diode D converges to the load voltage Vla while freely oscillating as shown in FIG. 3. A peak height of such a free oscillation voltage is varied by a value of the load voltage Vla. As shown in FIG. 3, if a load voltage Vla1 is smaller than a load voltage Vla2, then a peak voltage Vrp1 becomes smaller than a peak voltage Vrp2. Moreover, a cycle of the free oscillation voltage is decided in response to parasitic capacitances of the switching element Q and the diode D, which compose the chopper circuit, and is a substantially fixed value, and accordingly, is not changed even though the load voltage Vla is changed.

Figure 4:
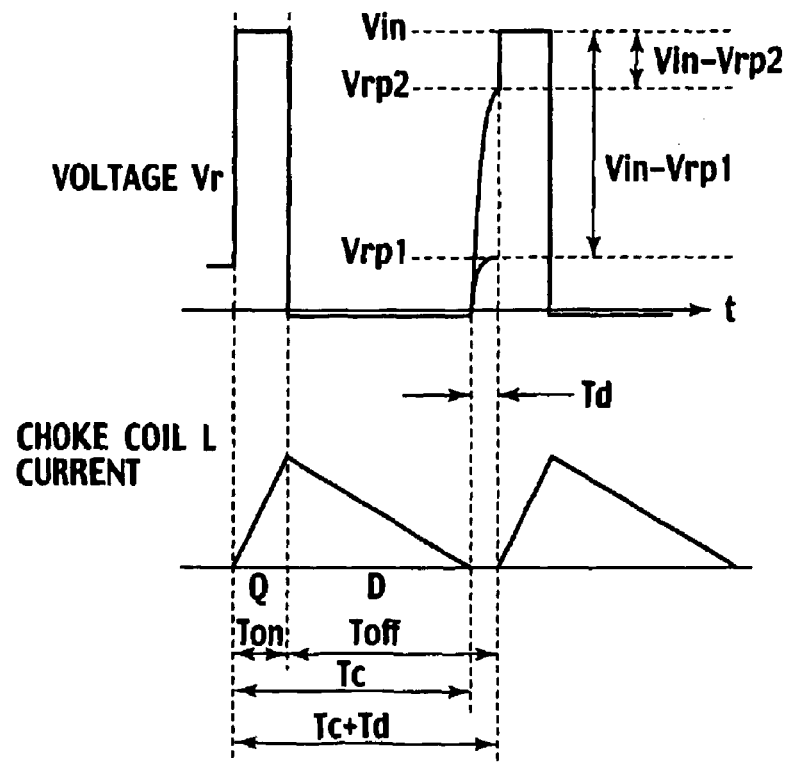
FIG. 4 is an operation explanatory view of Embodiment 3 of the present invention.

Accordingly, as shown in FIG. 4, the discharge lamp lighting device 1 according to Embodiment 3 defines, as a predetermined time, a time Td from the time when the regenerative current flowing through the diode D turns to zero to a time when the regenerative current turns to a peak voltage Vrp of a first half wave of the free oscillation voltage, and sets a switching cycle (Tc+Td) so as to turn on the switching element Q at a time in which the predetermined time Td is added to the above-described switching cycle Tc. In such a way, the voltage applied to the switching element Q becomes a value in which the peak voltage Vrp of the free oscillation voltage is subtracted from the input voltage Vin of the direct current power supply E, and a switching loss of the switching element Q is reduced.

Moreover, even if the load voltage Vla is changed, since the discharge lamp lighting device 1 sets, as the predetermined time, the time Td when the regenerative current turns to the peak voltage Vrp of the first half wave of the free oscillation voltage, the discharge lamp lighting device 1 can control the switching element Q to always turn on at the timing of the peak voltage Vrp of the free oscillation voltage.

Embodiment 4

Next, a description will be made of a discharge lamp lighting device 1 according to Embodiment 4 of the present invention.

Figure 5:
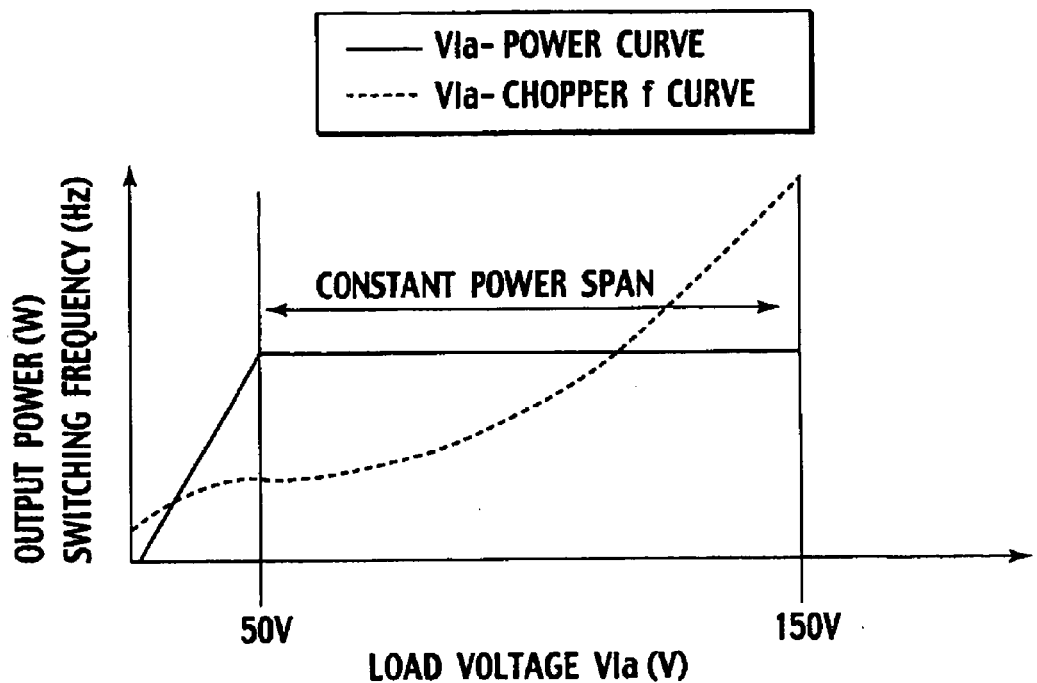
FIG. 5 is a graph showing a relationship between a switching frequency and an output voltage in Embodiments 1 to 3 of the present invention.

In the circuit configuration shown in FIG. 1 or FIG. 2, in the case where the discharge lamp La as the load is a high-intensity discharge lamp (HID lamp), as shown in FIG. 5, for the discharge lamp lighting device 1, a constant power control is required in a rated voltage range (for example, 50 to 150V) of the load voltage Vla. FIG. 5 shows a relationship between the load voltage Vla and the output power by a solid line, and shows a relationship between the load voltage Vla and the switching frequency of the chopper by a broken line.

When the discharge lamp lighting device 1 attempts to control the output power to be constant with respect to a rise of the load voltage Vla as shown by the solid line of FIG. 5, the switching frequency is increased as the load voltage Vla becomes larger as shown by the broken line of FIG. 5 in the case of turning on the switching element Q at timing when a chopper current turns to zero. In the case where an acoustic resonance frequency range intrinsic to the HID lamp is present within a range where the switching frequency is changed, when the switching frequency of the switching element Q passes through the acoustic resonance frequency range, flickering of the HID lamp is sometimes caused by a ripple component of the switching frequency superimposed of the load current.

Figure 6:
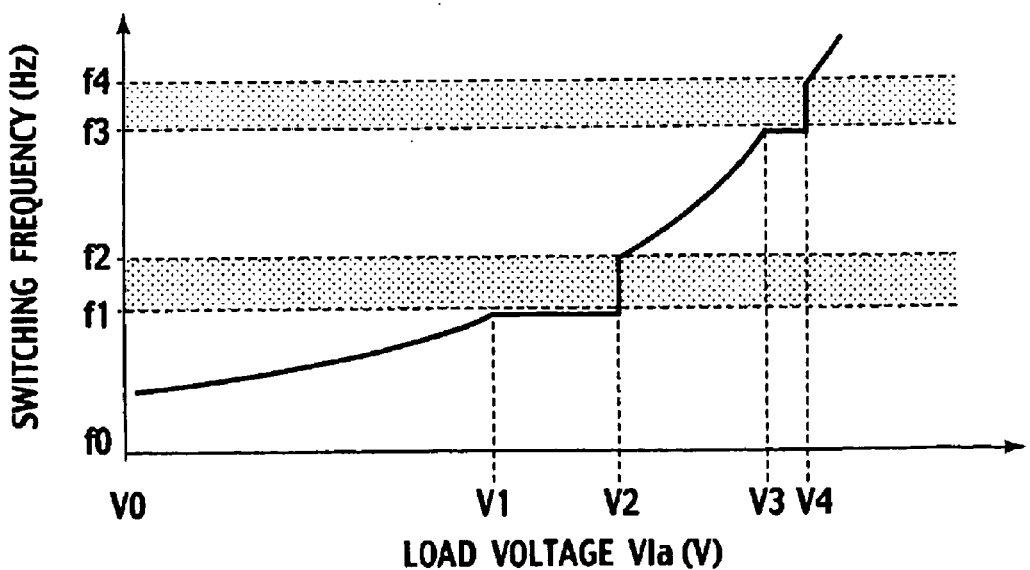
FIG. 6 is an operation explanatory view of Embodiment 4 of the present invention.

Accordingly, as shown in FIG. 6, in the case where the acoustic resonance frequency range of the HID lamp is present in f1 to f2 and f3 to f4, the discharge lamp lighting device 1 fixes the switching frequencies in sections of the load voltages V1 to V2 and V3 to V4 entering the acoustic resonance frequency ranges concerned to frequencies before entering the acoustic resonance frequency ranges concerned, sets the reference value Is corresponding to the power of the load at the frequencies thus fixed, and controls the switching element Q.

In accordance with the discharge lamp lighting device 1 according to this embodiment, the table data of the switching cycle Tc and the reference value Is, which corresponds to the load voltage Vla set in advance in the microcomputer 4, is only changed, and the switching circuit for avoiding the acoustic resonance frequency is not required. Accordingly, the discharge lamp lighting device 1 can easily avoid the operation at the acoustic resonance frequency without bringing up the cost increase. Moreover, in accordance with the discharge lamp lighting device 1, even a discharge lamp in which an acoustic resonance frequency range is different can be easily dealt with only by changing the table data.

Embodiment 5

Next, a description will be made of a discharge lamp lighting device 1 according to Embodiment 5 of the present invention.

Figure 7:
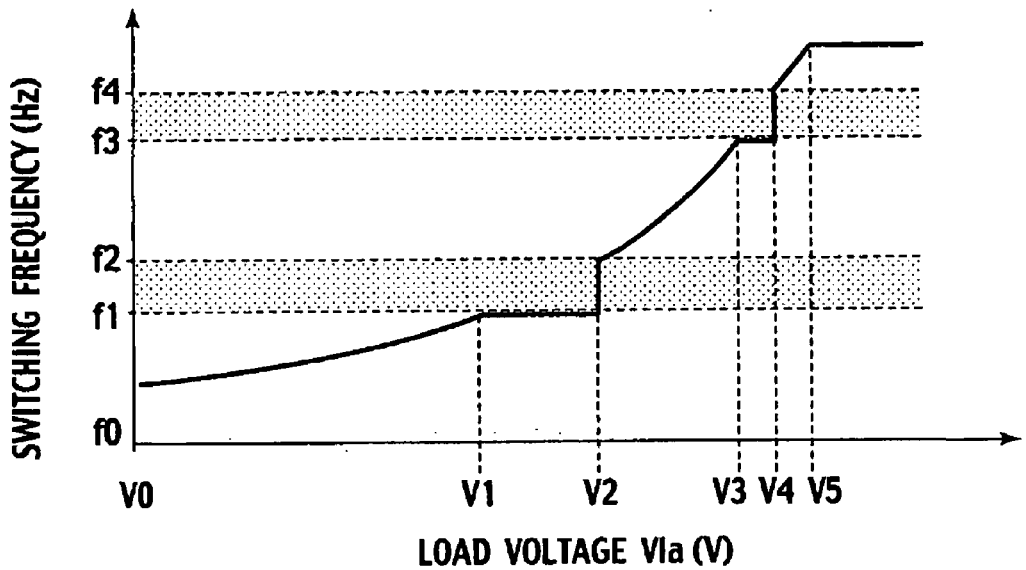
FIG. 7 is an operation explanatory view of Embodiment 5 of the present invention.

FIG. 7 is an operation explanatory view of the discharge lamp lighting device 1 according to Embodiment 5 of the present invention. A circuit configuration shown in FIG. 7 is similar to that of FIG. 1 or FIG. 2.

In a similar way to the discharge lamp lighting device 1 of the above-described embodiment 4, in the case where the acoustic resonance frequency range of the HID lamp is present in f1 to f2 and f3 to f4, the discharge lamp lighting device 1 according to Embodiment 5 fixes the switching frequencies in the sections of the load voltages V1 to V2 and V3 to V4 entering the acoustic resonance frequency ranges concerned to the frequencies before entering the acoustic resonance frequency ranges concerned. In such a way, the discharge lamp lighting device 1 avoids the operation at the acoustic resonance frequency, and in addition, sets the switching frequency at a fixed frequency in a range where the load voltage Vla is as high as V5 or more. The range where the load voltage Vla is as high as V5 or more becomes a range where the switching frequency is increased as the load voltage Vla becomes higher. Accordingly, the discharge lamp lighting device 1 sets the switching frequency at the fixed frequency, thereby reducing switching noise in the chopper circuit.

Embodiment 6

Next, a description will be made of a discharge lamp lighting device 1 according to Embodiment 6 of the present invention.

Figure 8:
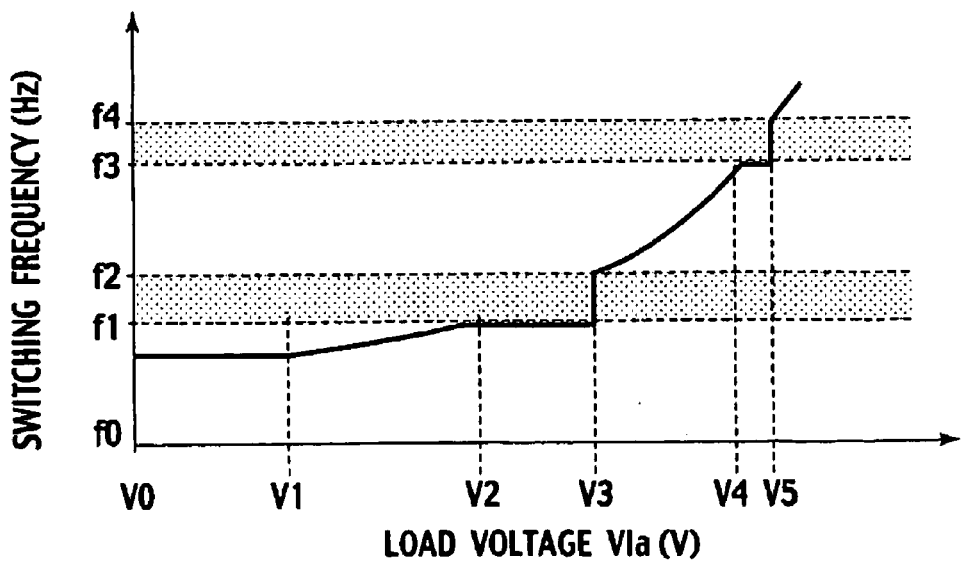
FIG. 8 is an operation explanatory view of Embodiment 6 of the present invention.

FIG. 8 is an operation explanatory view of the discharge lamp lighting device 1 according to Embodiment 6 of the present invention. A circuit configuration shown in FIG. 8 is similar to that of FIG. 1 or FIG. 2.

In a similar way to the discharge lamp lighting device 1 of the above-described embodiment 4, in the case where the acoustic resonance frequency range of the HID lamp is present in f1 to f2 and f3 to f4, the discharge lamp lighting device 1 according to Embodiment 6 fixes switching frequencies in sections of load voltages V2 to V3 and V4 to V5 entering the acoustic resonance frequency ranges concerned to frequencies before entering the acoustic resonance frequency ranges concerned. In such a way, the discharge lamp lighting device 1 avoids the operation at the acoustic resonance frequency, and in addition, sets the switching frequency at a fixed frequency in a range where the load voltage Vla is as low as V1 or less. When the switching frequency is decreased to such a range where the load voltage Vla is low in response to the decrease of the output power, there is a possibility that the switching frequency may enter an audible range. Accordingly, the discharge lamp lighting device 1 sets the switching frequency at the fixed frequency in the range where the load voltage Vla is V1 or lower, thereby avoiding an occurrence of audible noise.

Embodiment 7

Next, a description will be made of a discharge lamp lighting device 1 according to Embodiment 7 of the present invention.

Figure 9:
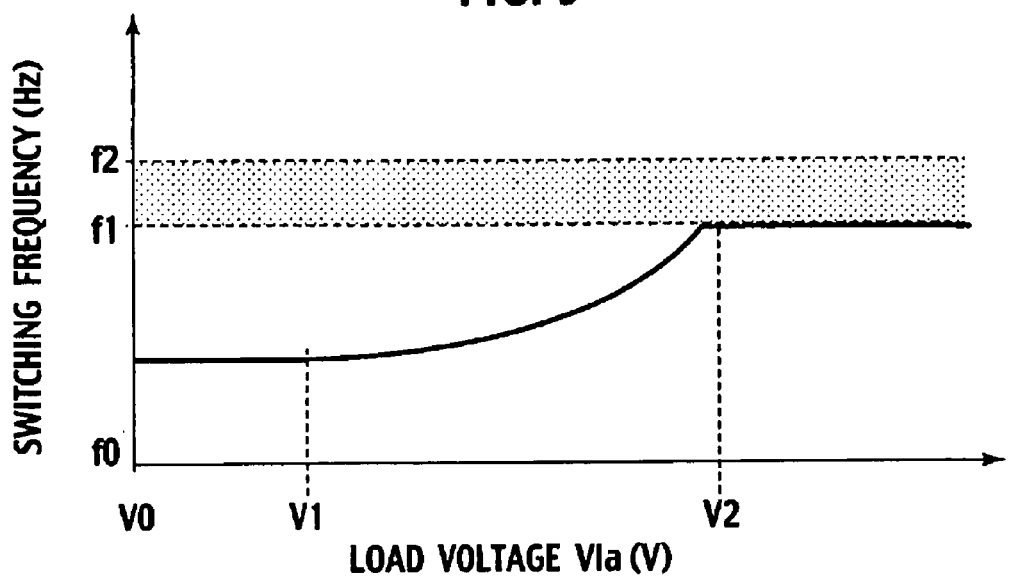
FIG. 9 is an operation explanatory view of Embodiment 7 of the present invention.

FIG. 9 is an operation explanatory view of the discharge lamp lighting device 1 according to Embodiment 7 of the present invention. A circuit configuration shown in FIG. 9 is similar to that of FIG. 1 or FIG. 2.

In the case where the acoustic resonance frequency range of the HID lamp is present in f1 to f2, the discharge lamp lighting device 1 according to Embodiment 7 fixes a switching frequency in a section of a load voltage V2 or higher entering the acoustic resonance frequency range concerned to the frequency f1 before entering the acoustic frequency range concerned. In such a way, the discharge lamp lighting device 1 avoids the operation at the acoustic resonance frequency. Moreover, in a range where the load voltage Vla is as low as V1 or less, the discharge lamp lighting device 1 sets the switching frequency at the fixed frequency. Specifically, at the acoustic resonance frequency of f1 or more, the discharge lamp lighting device 1 sets the switching frequency at the fixed frequency, thereby entirely avoiding a range of the switching frequency, where the acoustic resonance frequency is f1 or more. Moreover, in such a range where the load voltage Vla is low, there is a possibility that the switching frequency may enter the audible range, and accordingly, the discharge lamp lighting device 1 sets the switching frequency where the load voltage is V1 or less entirely at the fixed frequency, thereby also avoiding the occurrence of the audible noise.

Embodiment 8

Next, a description will be made of a discharge lamp lighting device 1 according to Embodiment 8 of the present invention.

Figure 10:
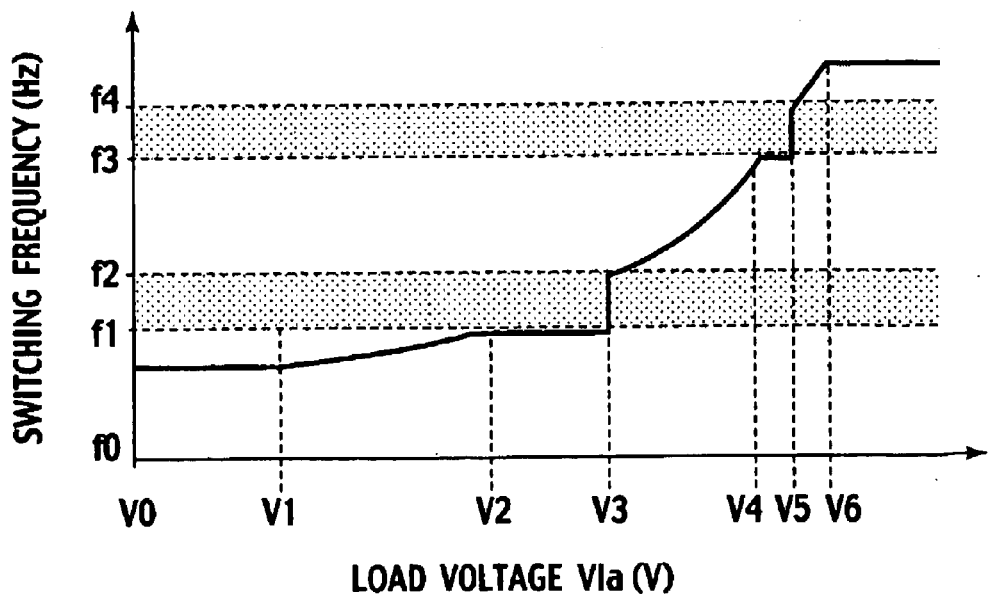
FIG. 10 is an operation explanatory view of Embodiment 8 of the present invention.
Figure 11:
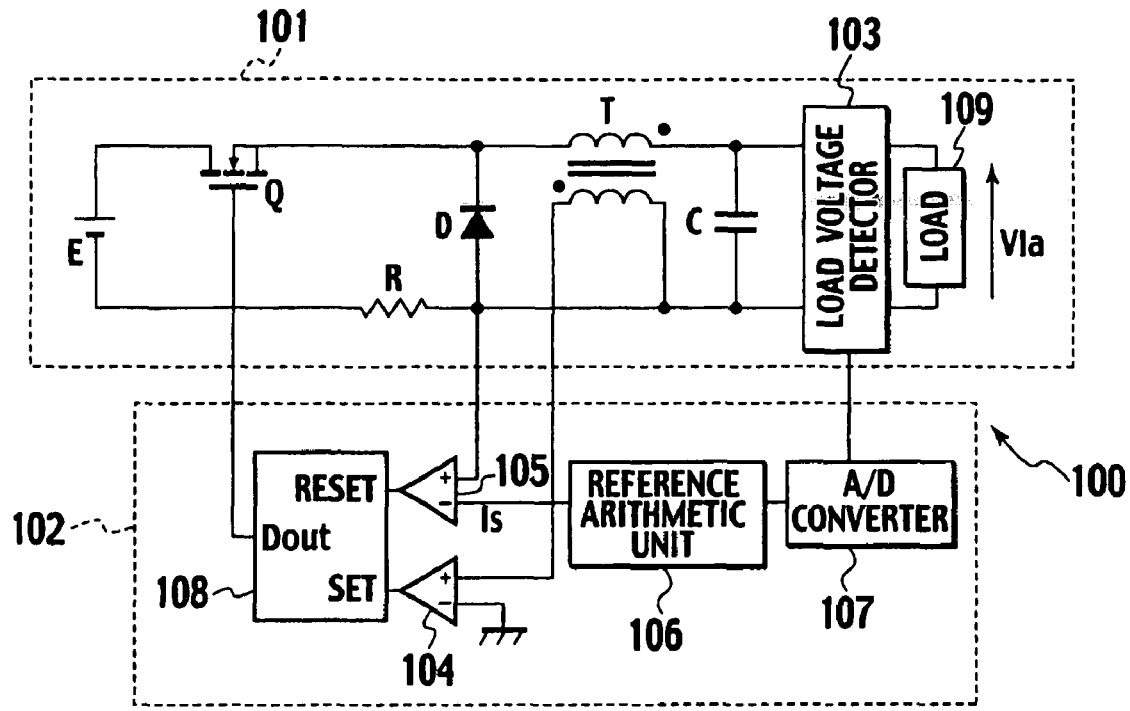
FIG. 11 is a circuit diagram showing a configuration of a conventional discharge lamp lighting device.

FIG. 10 is an operation explanatory view of the discharge lamp lighting device 1 according to Embodiment 8 of the present invention. A circuit configuration shown in FIG. 10 is similar to that of FIG. 1 or FIG. 2.

The discharge lamp lighting device 1 according to Embodiment 8 has a configuration in which the discharge lamp lighting device 1 according to Embodiment 5, which is shown in FIG. 7, and the discharge lamp lighting device 1 according to Embodiment 6, which is shown in FIG. 8, are combined together. In the case where the acoustic resonance frequency range of the HID lamp is present in f1 to f2 and f3 to f4, this discharge lamp lighting device 1 fixes the switching frequencies in the sections of the load voltages V2 to V3 and V4 to V5 entering the acoustic resonance frequency ranges concerned to the frequencies before entering the acoustic resonance frequency ranges concerned. In such a way, the discharge lamp lighting device 1 avoids the operation at the acoustic resonance frequency, and in addition, sets the switching frequency at a fixed frequency in a range where the load voltage Vla is as high as V6 or more. Moreover, in the range where the load voltage Vla is as low as V1 or less, the discharge lamp lighting device 1 sets the switching frequency at the fixed frequency.

Functions and effects of the discharge lamp lighting device 1 according to Embodiment 8 are ones in which functions and effects of the discharge lamp lighting devices 1 according to Embodiments 5 and 6 are combined together. In accordance with this discharge lamp lighting device 1, in the range where the load voltage Vla is as high as V6 or more, the switching frequency is set at the fixed frequency, thereby avoiding the switching frequency becoming too high, and reducing the switching noise in the chopper circuit. Moreover, in the range where the load voltage Vla is as low as V1 or less, the discharge lamp lighting device 1 sets the switching frequency at the fixed frequency, thereby avoiding the switching frequency entering the audible range, and also avoiding the occurrence of the audible noise.

Embodiment 9

Next, a description will be made of an image display device including the discharge lamp lighting device, which is according to Embodiment 9 of the present invention.

Figure 14:
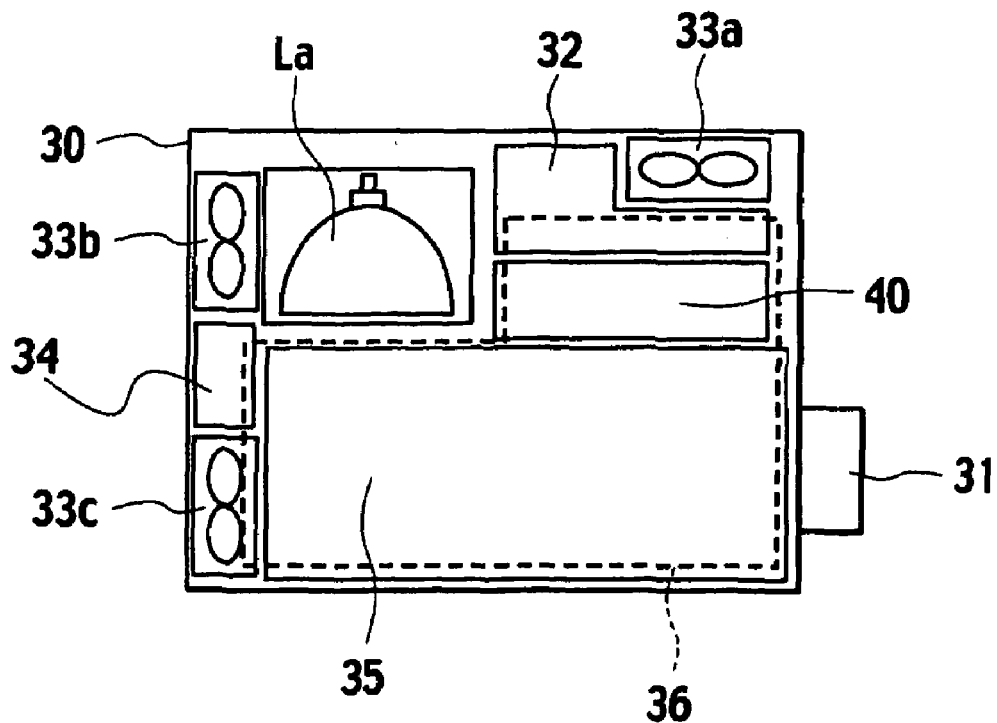
FIG. 14 is a schematic configuration view showing an internal configuration of an image display device of Embodiment 9 of the present invention.

The discharge lamp lighting devices of the above-described respective Embodiments 1 to 8 are used for lighting a discharge lamp serving as a light source of an image display device such as a projector and a rear projection television. Here, the case of mounting such a discharge lamp lighting device on the projector is illustrated. FIG. 14 is a schematic configuration view showing an internal configuration of an image display device 30. In FIG. 14, reference numeral 31 denotes a light projection window, reference numeral 32 denotes a power supply unit, reference numerals 33a, 33b and 33c denote cooling fans, reference numeral 34 denotes an external signal input unit, reference numeral 35 denotes an optical system, reference numeral 36 denotes a main control board, reference numeral 40 denotes the discharge lamp lighting device, and reference symbol La denotes the discharge lamp.

On this image display device 30, the main control board 36 is mounted within a frame shown by a broken line in FIG. 14. At a midpoint of the optical system 35, a transmission liquid crystal display plate, a reflection image display element or the like, which is an image display mechanism that transmits therethrough or reflects thereon light from the discharge lamp La, is provided. In the image display device 30, the optical system 35 is designed so as to project such transmission light or reflection light, which passes through the image display mechanism, on a screen.

As described above, the discharge lamp lighting device 40 is mounted in an inside of the image display device 30 together with the discharge lamp La. By employing the discharge lamp lighting device 40 of the present invention, the image display device 30 can be composed of the smaller number of parts at lower cost than heretofore. Moreover, the switching loss can be reduced by the discharge lamp lighting device 40, and accordingly, the image display device 30 enables the cooling fans to run silently. Furthermore, by the above-described discharge lamp lighting device 40, the operation at the acoustic resonance frequency, which is intrinsic to a high-voltage discharge lamp, can be avoided, and accordingly, the image display device 30 can avoid the flickering of the image.

INDUSTRIAL APPLICABILITY

The discharge lamp lighting device of the present invention can be utilized for the light source of the image display device or the like. The image display device of the present invention can be utilized for the projector or the like.

The invention claimed is:

1. A discharge lamp lighting device including a switching circuit that controls power supplied to a discharge lamp, in which, in the switching circuit, a switching frequency is controlled in response to a state of the discharge lamp, energy stored in an inductance component when a switching element is turned on is released when the switching element is turned off, and the switching element is controlled to turn on at a timing when a current for releasing the energy turns to substantial zero, the discharge lamp lighting device comprising:
   a load voltage detector that detects a load voltage;
   a switching frequency counting unit that performs time measurement for setting the switching frequency based on the voltage detected from the load voltage detector so that predetermined power of the discharge lamp can be achieved;
   a current detector that detects that the current flowing through the switching circuit has reached a predetermined reference value;
   a reference arithmetic unit that sets the predetermined reference value based on the voltage detected from the load voltage detector so that the switching element can be turned on and after the timing when the current for releasing the energy turns to substantial zero at the switching frequency set by the switching frequency counting unit; and
   a drive controller that controls the switching element to turn on upon receiving a signal of the switching frequency counting unit, and controls the switching element to turn off upon receiving an output signal of the current detector.

2. The discharge lamp lighting device according to claim 1, further comprising:
   an input voltage detector that detects an input voltage of the switching circuit,
   wherein, based on the input voltage detected from the input voltage detector and the load voltage detected from the load voltage detector, the switching frequency and the predetermined reference value are set so that the predetermined power of the discharge lamp can be achieved.

3. The discharge lamp lighting device according to claim 1, wherein the switching frequency and the predetermined reference value are set so that the switching element can turn on at timing of a peak voltage of a free oscillation voltage generated when the current for releasing the energy becomes substantially zero.

4. The discharge lamp lighting device according to claim 1, wherein, when the switching frequency set based on the voltage detected from the load voltage detector is superimposed on an operation-prohibited range, the switching frequency counting unit sets the switching frequency at a fixed frequency other than the operation-prohibited range.

5. An image display device, comprising:
   the discharge lamp lighting device according to claim 1;
   a discharge lamp turned on by the discharge lamp lighting device;
   an image display mechanism that transmits therethrough or reflects thereon light from the discharge lamp; and
   an optical system that projects transmission light or reflection light, which passes through the image display means, on a screen.

6. The discharge lamp lighting device according to claim 2, wherein the switching frequency and the predetermined reference value are set so that the switching element can turn on at timing of a peak voltage of a free oscillation voltage generated when the current for releasing the energy becomes substantially zero.

7. The discharge lamp lighting device according to claim 2, wherein, when the switching frequency set based on the voltage detected from the load voltage detector is superimposed on an operation-prohibited range, the switching frequency counting unit sets the switching frequency at a fixed frequency other than the operation-prohibited range.

8. The discharge lamp lighting device according to claim 3, wherein, when the switching frequency set based on the voltage detected from the load voltage detector is superimposed on an operation-prohibited range, the switching frequency counting unit sets the switching frequency at a fixed frequency other than the operation-prohibited range.

9. The discharge lamp lighting device according to claim 6, wherein, when the switching frequency set based on the voltage detected from the load voltage detector is superimposed on an operation-prohibited range, the switching frequency counting unit sets the switching frequency at a fixed frequency other than the operation-prohibited range.

10. An image display device, comprising:
the discharge lamp lighting device according to claim 2;
a discharge lamp turned on by the discharge lamp lighting device;
an image display mechanism that transmits therethrough or reflects thereon light from the discharge lamp; and
an optical system that projects transmission light or reflection light, which passes through the image display means, on a screen.

11. An image display device, comprising:
the discharge lamp lighting device according to claim 3;
a discharge lamp turned on by the discharge lamp lighting device;
an image display mechanism that transmits therethrough or reflects thereon light from the discharge lamp; and
an optical system that projects transmission light or reflection light, which passes through the image display means, on a screen.

12. An image display device, comprising:
the discharge lamp lighting device according to claim 4;
a discharge lamp turned on by the discharge lamp lighting device;
an image display mechanism that transmits therethrough or reflects thereon light from the discharge lamp; and
an optical system that projects transmission light or reflection light, which passes through the image display means, on a screen.

13. An image display device, comprising:
the discharge lamp lighting device according to claim 6;
a discharge lamp turned on by the discharge lamp lighting device;
an image display mechanism that transmits therethrough or reflects thereon light from the discharge lamp; and
an optical system that projects transmission light or reflection light, which passes through the image display means, on a screen.

14. An image display device, comprising:
the discharge lamp lighting device according to claim 7;
a discharge lamp turned on by the discharge lamp lighting device;
an image display mechanism that transmits therethrough or reflects thereon light from the discharge lamp; and
an optical system that projects transmission light or reflection light, which passes through the image display means, on a screen.

15. An image display device, comprising:
the discharge lamp lighting device according to claim 8;
a discharge lamp turned on by the discharge lamp lighting device;
an image display mechanism that transmits therethrough or reflects thereon light from the discharge lamp; and
an optical system that projects transmission light or reflection light, which passes through the image display means, on a screen.

16. An image display device, comprising:
the discharge lamp lighting device according to claim 9;
a discharge lamp turned on by the discharge lamp lighting device;
an image display mechanism that transmits therethrough or reflects thereon light from the discharge lamp; and
an optical system that projects transmission light or reflection light, which passes through the image display means, on a screen.

* * * * *